July 21, 1942. P. K. SAUNDERS 2,290,251
FLUID CONTROLLING VALVE
Filed Aug. 17, 1938 5 Sheets-Sheet 1

INVENTOR.
P. K. Saunders
BY
Simon Broder
ATTORNEY.

July 21, 1942.    P. K. SAUNDERS    2,290,251
FLUID CONTROLLING VALVE
Filed Aug. 17, 1938    5 Sheets-Sheet 2

INVENTOR
P. K. Saunders
BY
ATTORNEY

July 21, 1942.   P. K. SAUNDERS   2,290,251
FLUID CONTROLLING VALVE
Filed Aug. 17, 1938   5 Sheets-Sheet 3
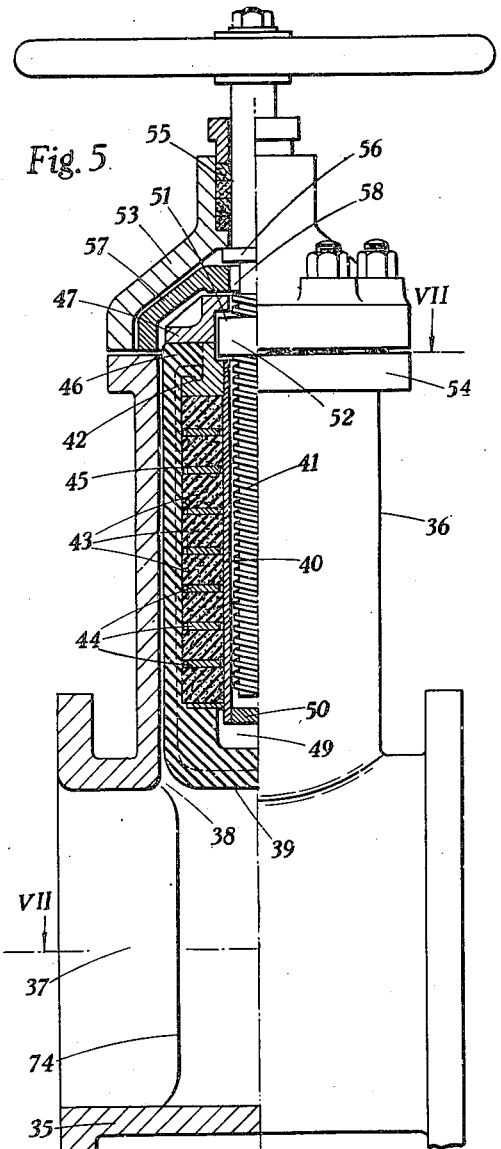
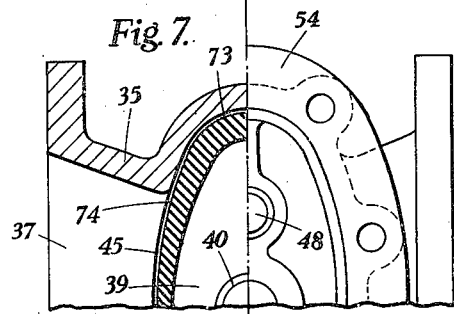
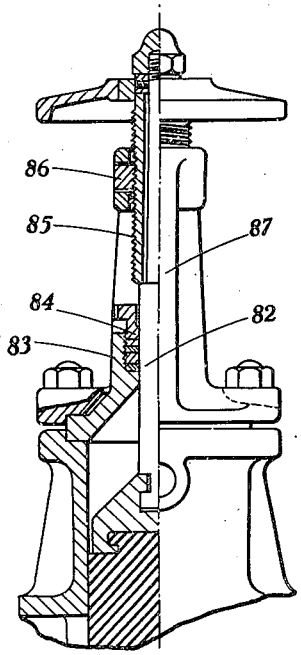
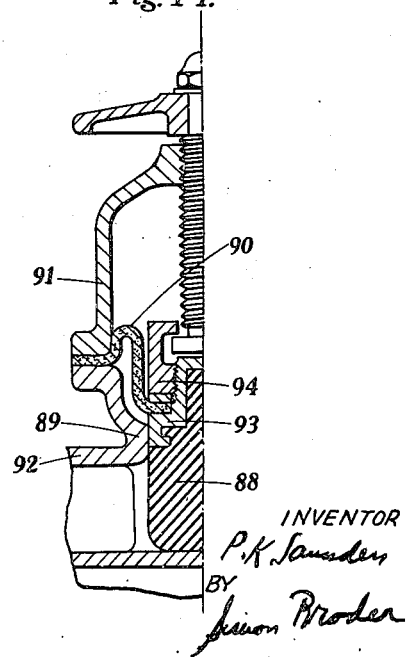
INVENTOR
P. K. Saunders
BY
Simon Broder
ATTORNEY July 21, 1942.   P. K. SAUNDERS   2,290,251
FLUID CONTROLLING VALVE
Filed Aug. 17, 1938   5 Sheets-Sheet 4

INVENTOR
P. K. Saunders
BY
ATTORNEY

INVENTOR
P. K. Saunders
BY
ATTORNEY

Patented July 21, 1942

2,290,251

UNITED STATES PATENT OFFICE 2,290,251

FLUID CONTROLLING VALVE

Philip Keith Saunders, Wolverhampton, Staffordshire, England

Application August 17, 1938, Serial No. 225,436
In Great Britain August 20, 1937

11 Claims. (Cl. 251—63.5)

This invention relates to fluid controlling valves for controlling the flow through the valve of liquids, gases, sludges and the like, of the type in which a closure member is moved transversely across the bore of the valve.

A division of this application was filed March 16, 1942, as Serial Number 434,939.

A principal object of the invention is to provide such a valve having a straight through bore without the usual pocket or recess with which the closure member co-operates as in the standard form of gate valve. Such a recess collects solid matter when the valve is controlling a sludge and thus eventually interferes with the proper functioning of the valve. Furthermore, when such a valve is controlling milk, beer, or similar liquids, a small quantity of liquid is trapped in the recess and may putrefy.

A further object is to provide such a valve with a closure member of rubber or other resilient material and to construct the valve in such a way that the surface of the closure member is not rubbed on or dragged across the surface of the bore but only moved normally to it while in contact with the bore.

A still further object is to provide an inexpensive, compact, robust and reliable valve from which satisfactory results will be obtained when controlling any kind of fluid.

With these and other objects in view the present invention consists primarily of a valve body having a substantially straight through bore with a substantially flat or continuously aligned (in the direction of the axis of the bore) wall on one side of the bore and a port in the other side of the bore, a resilient plug of cross section corresponding to the port and slidably mounted for movement through it, and valve operating means for moving the plug from a position retracted through a port leaving the bore substantially unimpeded to a position compressed against the opposite side of the bore and thereby expanded to seal both bore and port.

Usually the plug is cylindrical and of greater diameter than that of the bore and is slidably mounted within a cylindrical chamber mounted transversely on the valve body so as to communicate with the bore through the port. The chamber may be either integral with the valve body or a separate member.

The resilient plug is usually made of hard rubber having a hardness comparable with that of a soft wood such as deal, but in some cases may be composite and reinforced.

Actuation of the valve may be effected manually by screw mechanism mounted in a domed cover or bonnet fitted to the top of the chamber accommodating the plug.

These and other features of the invention are hereinafter more fully described with reference to the accompanying drawings, in which—

Figs. 5 and 6 are views similar to Figs. 1 and 2 of a valve in accordance with the invention having an elliptical plug.

Fig. 7 is a section on the line VII—VII of Fig. 5 with the plug in the valve closing position.

Fig. 13 shows a modified form of valve in accordance with the invention for use in controlling fluids under high pressure.

Fig. 14 shows another modification of the invention.

Figure 1:
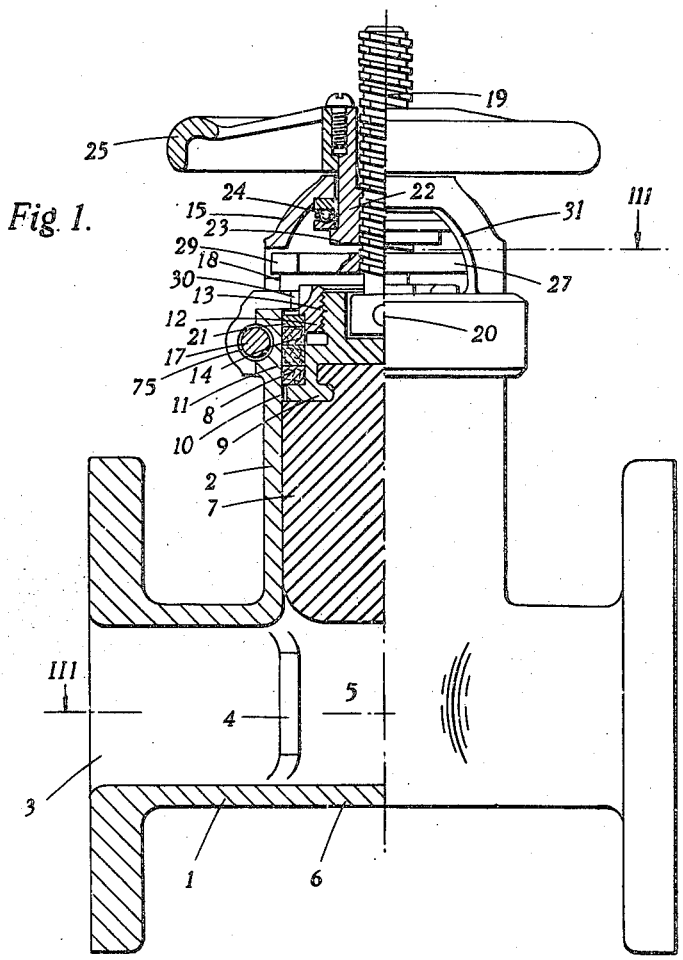
Fig. 1 is an elevation half in section of a valve in accordance with the invention.
Figure 3:
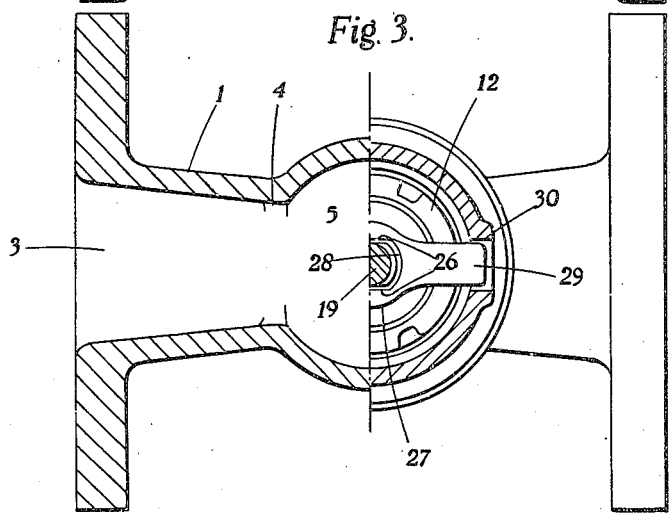
Fig. 3 is a section on the line III—III of Fig. 1.
Figure 2:
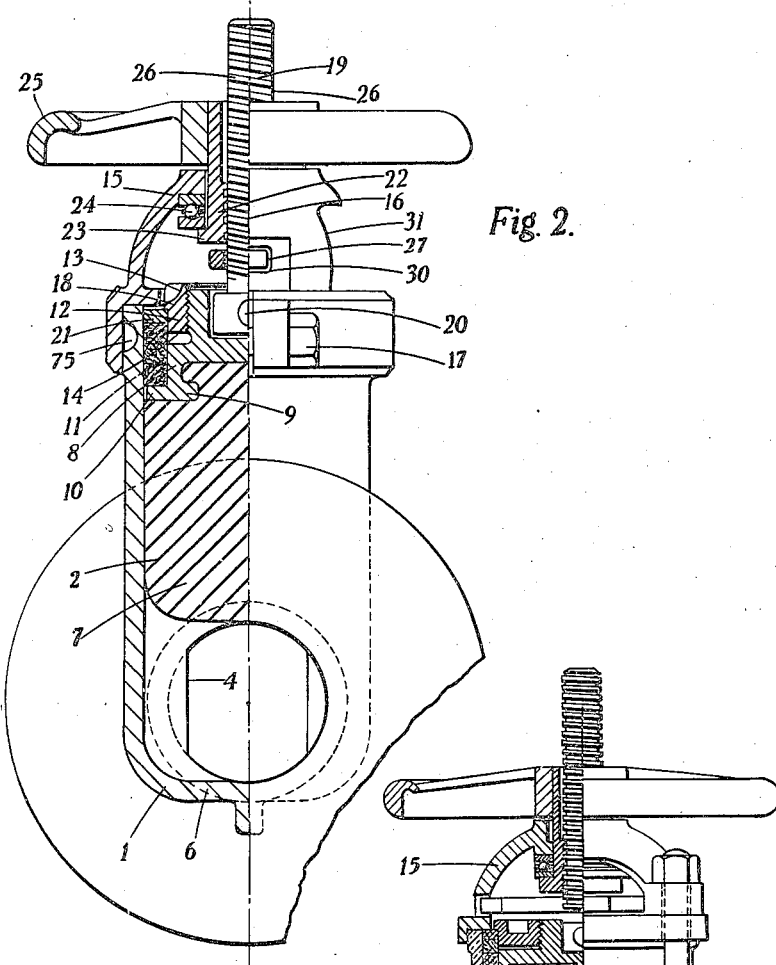
Fig. 2 is another elevation half in section at right angles to that in Fig. 1.

Referring now to Figs. 1 to 3, the valve illustrated therein has a body 1 and a transverse cylindrical chamber 2 cast in one piece. The bore of the body merges gradually from circular cross section at the ends 3 to a circular cross section with flat sides at the points 4 where the bore enters a transverse cylindrical part 5 which is a continuation of the chamber 2. The wall 6 of the bore opposite the chamber is flat. Thus along the centre line of the bore this wall is continuously aligned from one end of the body to the other. Conveniently the diameter of the chamber 2 is 1¼ times the diameter of the ends 3 of the bore.

The bore of the transverse chamber 2 is machined and within this chamber is slidably mounted a cylindrical resilient plug 7 formed of a rubber compound having a hardness comparable with that of a soft wood such as deal. The plug is vulcanised to a metal cap 8 with a suitably shaped depending and inwardly projecting flange 9 to secure it. This flange also projects outwardly at 10. A gland between the plug 7 and chamber 2 is formed by a packing 11 consisting of three packing rings secured between this outwardly projecting flange 10 and an annular washer 21 which is held in position by a castellated nut 12 screwed on to a threaded boss 13 on top of the cap 8. The nut 12 has a boss 14 which projects through the washer 21 so as to form a surface against which at least a part of the packing 11 will abut.

On top of the chamber is attached a domed casing or bonnet 15 which carries the valve actuating gear. This bonnet 15 has a radial split 16 and is clamped in position upon the chamber by means of a tangential bolt 17 which draws parts of the bonnet 15 on the opposite sides of the split 16 together. This bolt 17 also engages an external circumferential groove 75 in the chamber. The bonnet 15 has an inwardly projecting flange 18 against which the top of the chamber abuts. This flange projects inwards slightly beyond the inside surface of the chamber 2, and, therefore, provides a shoulder against which the washer 21 securing the packing gland 11 will abut, thus limiting movement of the plug 7 in the opening direction.

The plug 7 is moved transversely across the bore by means of an externally threaded spindle 19 pivotally attached at 20 to the cap 8. This spindle 19 is engaged by an internally threaded bush 22 which is rotatably mounted centrally in the top of the bonnet 15 and prevented from endwise movement thereto by an external collar 23 on its inner end between which and the bonnet 15 there is a thrust race 24, and a hand wheel 25 keyed to its outer end. The spindle has flats 26 on opposite sides and is prevented from rotation relatively to the bonnet 15 by means of a keying yoke 27 with an aperture 28 of similar cross section to that of the spindle 19 and having arms 29 which are secured in suitably diametrically opposite slots 30 in the bonnet 15.

In operation the plug may be fully retracted so that its end is flush with the wall of the bore of the valve body 1 surrounding the port communicating with the chamber 2. In this position the washer 21 securing the packing gland 11 will be pressed against the limiting flange 18 on the bonnet 15, thereby tightening the gland and relieving the load on the castellated nut 12, which accordingly may be tightened by means of a suitable implement through a convenient aperture 31 provided in the side of the bonnet 15. Due to the presence of the boss 14 on the castellated nut 12 against which part of the gland abuts, there is no danger, on account of vibration set up in the pipe, of the nut 12 becoming loose when the valve is fully open.

To close the valve the hand wheel 25 is turned, so rotating the bush 22 and moving the spindle 19 in an axial direction and with it the plug 7. When the plug contacts with the flat wall 6 of the bore opposite the chamber further movement of the actuating wheel compresses the plug 7 axially and expands it radially, thus sealing the bore of the valve body 1 and at the same time expanding the part of the plug 7 within the chamber 2 into contact with its wall and thus also sealing the port between the valve body 1 and chamber 2.

Figure 4:
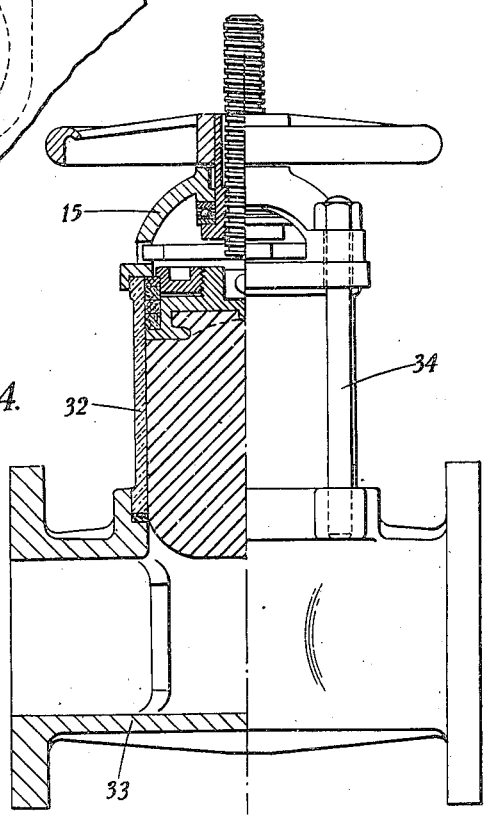
Fig. 4 is a view similar to Fig. 1 of an alternative form of construction.

In the valve described above the valve body 1 and chamber 2 are integral, and accordingly the only joint between the chamber 2 and the bonnet 15 is above the fluid and therefore need not be fluid tight. Since, however, the chamber 2 has a working surface in contact with the fluid controlled it must be of anti-corrosive metal such as nickel iron or gunmetal. On large valves, say 2½" and upwards, it is not desirable on account of expense to make the valve body and chamber in one piece. This difficulty is overcome in the modified form of valve illustrated in Fig. 4 wherein the chamber is formed by a comparatively light cylinder 32 of anti-corrosive material mounted between a valve body 33 and bonnet 15 of, say, cast iron, and the assembly is secured by four tie-rods 34 running from the valve body 33 to the bonnet 15. By this means the very considerable tensile stresses, which may be set up when the valve is fully closed, are taken by the tie-rods and not by the cylinder 32, which accordingly may be made of comparatively weak material, such as glass.

In valves in which the plug is of non-circular cross section a keying device such as the yoke 27 in the construction described with reference to Figs. 1 to 4 is obviously not required. Also, in certain cases, particularly when the fluid being controlled is not at a high pressure the gland between the plug and the chamber may be sufficient to prevent rotation of the spindle relatively to the bonnet. In all such cases where the keying device is dispensed with in order to make the valve even more compact, the handwheel may be keyed to the actuating spindle, which in turn co-operates with a nut fixedly mounted in the cap of the plug.

Figure 6:
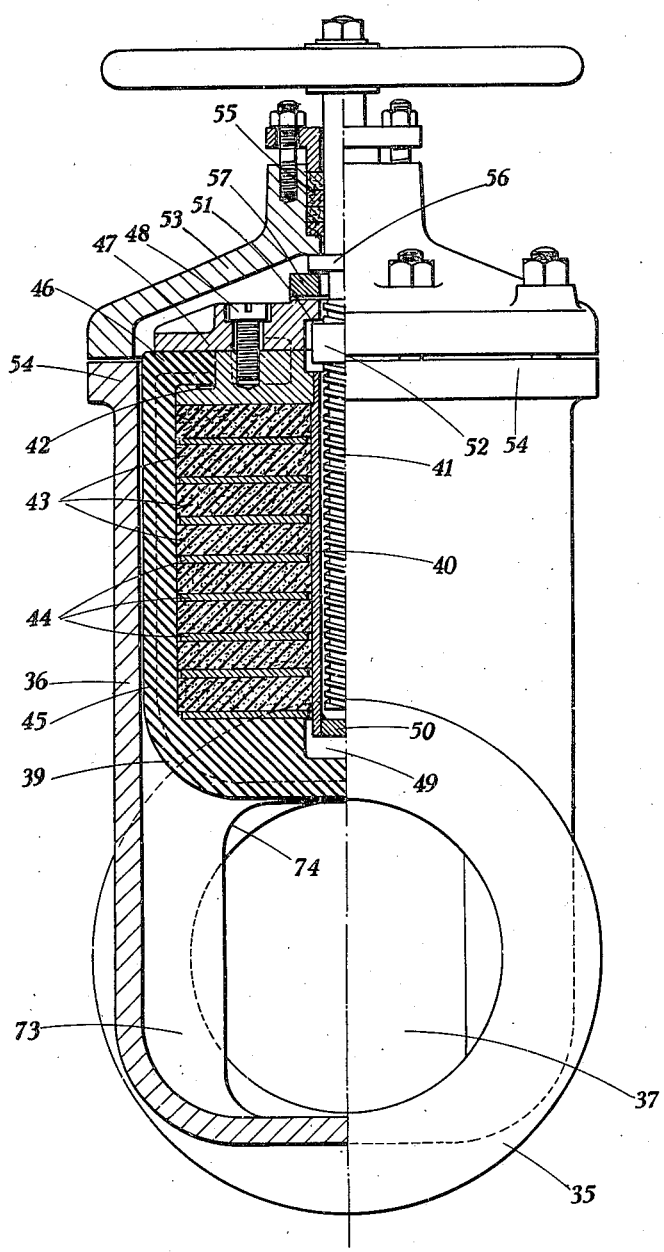

A preferred form of large sized valve, say 6" and upwards, with an elliptical plug arranged with its major axis perpendicular to the axis of the bore is described hereafter with reference to Figs. 5 to 7. The valve body 35 and a transverse chamber 36 communicating with the bore 37 of the body through a port 38 are cast in one piece. The chamber 36 has an elliptical cross section corresponding to that of the plug. The contour of the chamber 36 is continued into the bore 37 of the valve body 35, that is to say, there are pockets 73 in the sides of the bore 37 whose contour corresponds with that of the parts about the extremities of the major axis of the elliptical chamber 36. The ends of the bore 37 of the valve body communicate with this latter part of the bore opposite the chamber through rectangular openings 74, the walls of the bore 37 being merged gradually from a circular contour at the ends to these rectangular openings 74. To give an indication of the relative dimensions of the valve body, in a 10" valve, for example, the elliptical plug may have a major axis of length 12½" and a minor axis of length 6¼"; the valve body may have a length of 12½" overall and the rectangular openings in its bore mentioned above may be 10" high by 7½" wide. Thus the bore provides full flow area throughout its length.

The resilient plug 39 is preferably composite and reinforced and may be built up as follows. A central metal tube 40 with a closed lower end 50 which accommodates a non-rising actuating spindle 41 forms the basis of reinforcement. Integral with this tube or mounted on it at its top is an elliptical cap 42 of somewhat smaller dimensions than the plug 39 itself. Surrounding the tube are a series of soft rubber elliptical lozenges 43 interspersed with elliptical metal discs 44, both rubber lozenges and discs being of similar size to the cap and free to slide relatively to the tube. The plug is completed by an outside envelope 45 of relatively hard rubber having an inturned lip 46 at its top end which is secured by an elliptical plate 47 attached to the cap 42, as, for example, by screws 48, thus clamping the lip 46 of the envelope around its periphery. The outer envelope 45 is in contact with the sides of the soft rubber lozenges and with the lower face of the bottom lozenge, but there is substantial clearance 49 between it and the bottom 50 of the tube 40. In this way when compressed axially the plug 39 expands laterally, uniformly throughout its length, despite the reinforcement, since the soft rubber lozenges 43 and the envelope 45 are free to move relatively to the reinforcing tube 40.

The clamping plate 47 has an aperture in register with the main reinforcing tube and forms with the cap 42 a square recess 51 which accommodates a nut 52 with which the actuating spindle 41 co-operates. The nut 52 is thereby prevented from rotating relatively to the plug and from axial movement relatively to it.

The top of the chamber 36 is enclosed by a bonnet 53 of elliptical contour bolted around its periphery to a flange 54 surrounding the chamber. The spindle 41 which has the usual handwheel keyed to it passes through a conventional stuffing box 55 in the centre of the bonnet 53. The spindle 41 has a collar 56 bearing against the inside surface of the bonnet 53. A bridge 57 supported at each end on the top of the chamber 36 at opposite ends of the minor axis of its elliptical periphery, has a central aperture 58, through which the spindle 41 passes and upon the sides of which the collar 56 rests, thus preventing axial movement of the spindle 41 relatively to the bonnet 53.

Conveniently the tube 40 forming the main reinforcement of the plug 39 is filled with a lubricant before assembly, so that each time the valve is opened the actuating spindle 41 is lubricated, and then when closed again transmits the lubricant to its co-operating nut 52.

A valve such as has been described is considerably lighter than a corresponding valve with a cylindrical plug and moreover, such a valve may be made with the body of overall length comparable to that of standard forms of sluice valve.

It should be understood that the method of reinforcing the plug just described whereby the body of the plug and radial reinforcement is free to move axially relatively to the axial reinforcement is equally applicable to any of the valves, but particularly large size valves, in accordance with the invention.

The modification illustrated in Figs. 8 to 12 is designed for the control of compressed air. The valve body 59 has a transverse cylindrical chamber 60, in which is slidably mounted a resilient hard rubber cylindrical plug 61. In order to make the valve as compact as possible, the plug 61 is shorter relatively to the bore of the valve body 59 than in the other valves illustrated in the drawings. As a result the wall of the chamber 60 is extended at 62 a short distance into the bore of the valve, so that in the fully open position as shown the bore of the valve has the form of a venturi.

The plug 61 is vulcanised to a cap 76 which is integral with a screwed boss 63 and a threaded spindle 64. A gland between the plug 61 and the chamber 60 is provided by a double cup leather 65 having the form of an annulus of T section radially. This cup leather is secured by a retaining ring 66 screwed on to the boss 63. The spindle 64 has flat sides 67 and is prevented from rotation relatively to the body by a keying plate 68 (see Figs. 11 and 12) made from an annular sheet of metal with a central aperture 69 of cross section corresponding to that of the spindle formed by bending down the surrounding edge of a smaller aperture in the metal blank from which the plate is made. An annular fibre washer 70 and this plate 68, whose turned down edge forms a protection for the edge of the central aperture of the washer 70 are placed upon the open end of the chamber 60 with the spindle 64 passing through them. An internally screwed cover or bonnet 71 screwed on to the end of the chamber clamps the washer 70 and plate 68 against the end of the chamber 60.

An internally threaded bush 79 for co-operation with the spindle 64 is rotatably mounted in the top of the bonnet 71 and is endwise located by means of a collar 80 on it bearing against the inside of the bonnet 71 and a hand wheel 81 keyed to the projecting end of the bush.

Figure 8:
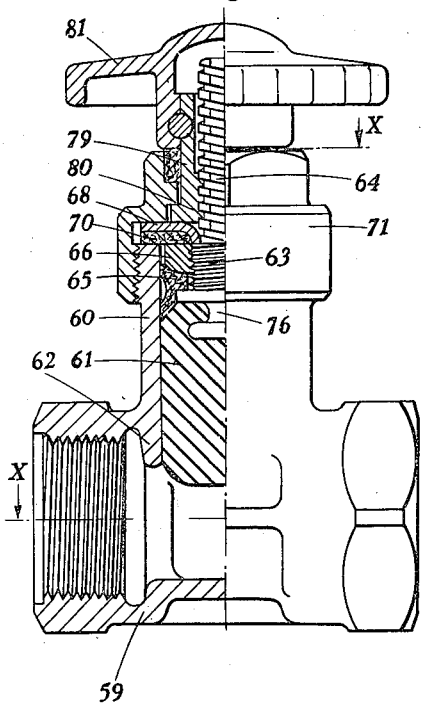
Figs. 8 and 9 are views similar to Figs. 1 and 2 of a further modification of the invention.
Figure 9:
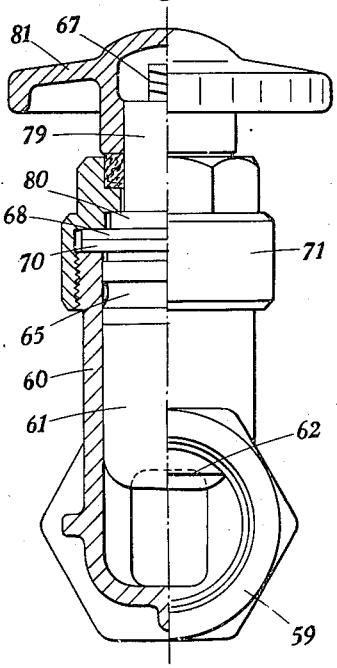
Figure 10:
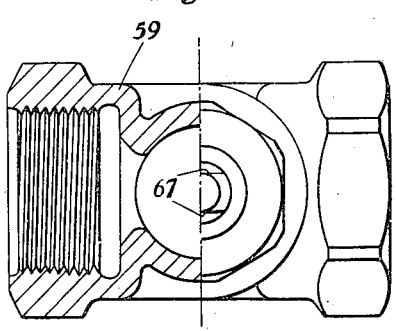
Fig. 10 is a section on the line X—X of Fig. 8.
Figure 11:
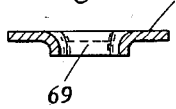
Figs. 11 and 12 are detail views of the keying plate used in the construction shown in Figs. 8, 9 and 10.
Figure 12:
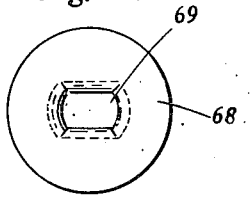

When the valve is in the fully open position as shown in Fig. 8 the ring 66 is pressed against the fibre washer 70 so preventing any possibility of leakage past the gland when the valve is in this position.

If a valve is required for controlling fluids under high pressure then the valve is modified as in Fig. 13. The actuating spindle has a cylindrical part 82 which passes out of the bonnet 83 through a conventional stuffing box 84. A threaded part 85 of the spindle outside the bonnet 83 co-operates with a nut 86 located endwise relatively to the bonnet by pillars 87 projecting therefrom.

In a further modification illustrated in Fig. 14 instead of a gland between the resilient plug 88 and the chamber 89, an annular flexible diaphragm 90 is provided. This diaphragm 90 is clamped at its outer circumferential edge between the bonnet 91 and the valve body 92 and at its inner circumferential edge between a cap 93 to which the plug 88 is vulcanized and a retaining ring 94.

What I claim is:

1. A fluid controlling valve, comprising a valve body having a substantially straight through bore with a continuously aligned (in the direction of the axis of the bore) wall on one side of the bore and a port in the opposite side, a resilient plug of uniform cross section corresponding to the port and slidably mounted for movement through it, and valve operating means for moving the plug from a position retracted through the port to a position compressed against the opposite side of the bore, said plug having a solid tip which is substantially in line with the bore when the plug is in retracted position, whereby the fluid is not impeded or trapped.

2. A fluid controlling valve, comprising a valve body having a substantially straight through bore with a continuously aligned (in the direction of the axis of the bore) wall on one side of the bore and a circular port in the opposite side, a cylindrical resilient plug of corresponding diameter to said port and slidably mounted for movement through it, and valve operating means for moving the plug from a position retracted through the port to a position compressed against the opposite side of the bore, said plug having a solid tip which is substantially in line with the bore when the plug is in retracted position, whereby the fluid is not impeded or trapped.

3. A fluid controlling valve, comprising a valve body having a substantially straight through bore with a continuously aligned (in the direction of the axis of the bore) wall on one side of the bore and a chamber of uniform cross-section on the other side of the bore with its axis perpendicular to the axis of the bore and communicating with it through a port in the side of the bore opposite the aligned part, a resilient plug of uniform cross section corresponding to that of the chamber and slidably mounted within it, and valve operating means for moving the plug from a position retracted within the chamber to a position compressed against the opposite side of the bore, said plug having a solid tip which is substantially in line with the bore when the plug is in retracted position, whereby the fluid is not impeded or trapped.

4. A fluid controlling valve, comprising a valve body having a substantially straight through bore with a continuously aligned (in the direction of the axis of the bore) wall on one side of the bore and a cylindrical chamber on the other side of the bore with its axis perpendicular to the axis of the bore and communicating with it through a circular port in the side of the bore opposite the aligned part, a cylindrical resilient plug of corresponding diameter to that of the chamber and slidably mounted within it, and valve operating means for moving the plug from a position retracted within the chamber to a position compressed against the opposite side of the bore, said plug having a solid tip which is substantially in line with the bore when the plug is in retracted position, whereby the fluid is not impeded or trapped.

5. A fluid controlling valve, comprising a valve body having a substantially straight through bore with a continuously aligned (in the direction of the axis of the bore) wall on one side of the bore and a chamber of uniform cross-section integral with it on the other side of the bore with its axis perpendicular to the axis of the bore and communicating with it through a port in the side of the bore opposite the aligned part, a resilient plug of uniform cross section corresponding to that of the chamber and slidably mounted within it, and valve operating means for moving the plug from a position retracted within the chamber to a position compressed against the opposite side of the bore, said plug having a solid tip which is substantially in line with the bore when the plug is in retracted position, whereby the fluid is not impeded or trapped.

6. A fluid controlling valve, comprising a valve body having a substantially straight through bore with a continuously aligned (in the direction of the axis of the bore) wall on one side of the bore and a cylindrical chamber integral with it on the other side of the bore with its axis perpendicular to the axis of the bore and communicating with it through a circular port in the side of the bore opposite the aligned part, a cylindrical resilient plug of corresponding diameter to that of the chamber and slidably mounted within it, and valve operating means for moving the plug from a position retracted within the chamber to a position compressed against the opposite side of the bore, said plug having a solid tip which is substantially in line with the bore when the plug is in retracted position, whereby the fluid is not impeded or trapped.

7. A fluid controlling valve, comprising a valve body having a substantially straight through bore with a continuously aligned (in the direction of the axis of the bore) wall on one side of the bore and a chamber of uniform cross-section on the other side of the bore with its axis perpendicular to the axis of the bore and communicating with it through a port in the side of the bore opposite the aligned part, a resilient plug of uniform cross section corresponding to that of the chamber and slidably mounted within it, a bonnet mounted on the end of said chamber remote from the bore, and manually operable screw actuating mechanism located centrally within said bonnet for moving the plug from a position retracted within the chamber to a position compressed against the opposite side of the bore, said plug having a solid tip which is substantially in line with the bore when the plug is in retracted position, whereby the fluid is not impeded or trapped.

8. A fluid controlling valve, comprising a valve body having a substantially straight through bore with a continuously aligned (in the direction of the axis of the bore) wall on one side of the bore and a cylindrical chamber on the other side of the bore with its axis perpendicular to the axis of the bore and communicating with it through a circular port in the side of the bore opposite the aligned part, a cylindrical resilient plug of corresponding diameter to that of the chamber and slidably mounted within it, a circular bonnet mounted on the end of said chamber remote from the bore, and manually operable screw actuating mechanism located centrally within said bonnet for moving the plug from a position retracted within the chamber to a position compressed against the opposite side of the bore, said plug having a solid tip which is substantially in line with the bore when the plug is in retracted position, whereby the fluid is not impeded or trapped.

9. A fluid controlling valve, comprising a valve body having a cylindrical chamber on the side of the bore of the valve with its axis perpendicular to the axis of the bore and communicating with it through a circular port in the side of the bore, a cylindrical resilient plug slidably mounted within the chamber and having a metal cap of smaller diameter than itself with a central threaded boss, an annular packing surrounding said cap, an annular packing retaining ring, a castellated nut of smaller external diameter than said ring screwed on to said boss and securing said ring and thereby said packing, a bonnet with a cut away opening in its side mounted on the end of the chamber remote from the bore having adjacent its periphery an inwardly projecting flange of internal diameter less than that of the chamber but more than that of the nut, and valve operating means mounted in said bonnet for moving the plug from a position retracted within the chamber to a position compressed against the opposite side of the bore.

10. A fluid controlling valve, comprising a valve body having a cylindrical chamber on the side of the bore of the valve with its axis perpendicular to the axis of the bore and communicating with it through a circular port in the side of the bore, a cylindrical resilient plug slidably mounted within the chamber and having a metal cap of smaller diameter than itself with a central threaded boss, an annular packing surrounding said cap, an annular packing retaining ring, a castellated nut of smaller external diameter than said ring screwed on to said boss and securing said ring and thereby said packing and having a part projecting through said ring to form a backing for at least part of said packing, a bonnet with a cut away opening in its side mounted on the end of the chamber remote from the bore having adjacent its periphery an inwardly projecting flange of internal diameter less than that of the chamber but more than that of the nut, and valve operating means mounted in said bonnet for moving the plug from a position retracted within the chamber to a position compressed against the opposite side of the bore.

11. A fluid controlling valve, comprising a cast valve body with a circular port in one side of the bore of the valve, a non-corrosive barrel with a smooth bore of internal diameter equal to that of the port arranged in register with said port, a cylindrical resilient plug slidably mounted within said barrel, a gland between said barrel and said plug, a bonnet mounted on the end of the barrel remote from the valve body and attached thereto by tie rods, and valve operating means for moving the plug from a position retracted within the barrel to a position compressed against the opposite side of the bore of the valve.

PHILIP KEITH SAUNDERS.